June 21, 1966    J. ALESI, JR., ET AL    3,256,565
VACUUM FORMING APPARATUS
Filed Dec. 31, 1962    4 Sheets-Sheet 1

INVENTORS
JOHN ALESI, JR.
JOHN A. ALESI
BY KENDRICK AND STOLZY

*A. Donald Stolzy*

ATTORNEYS.

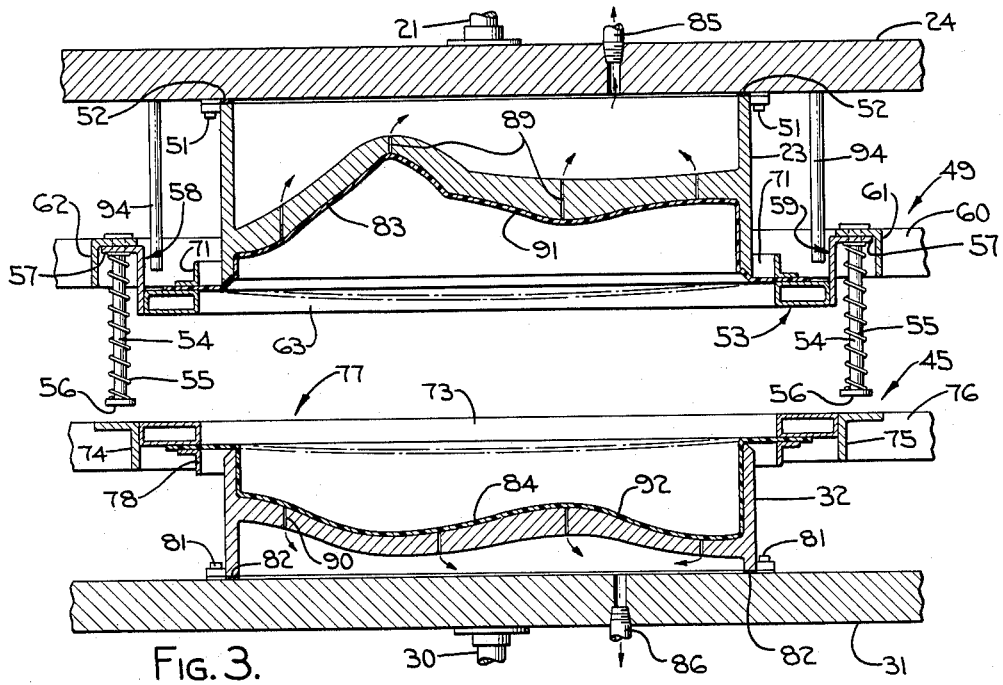

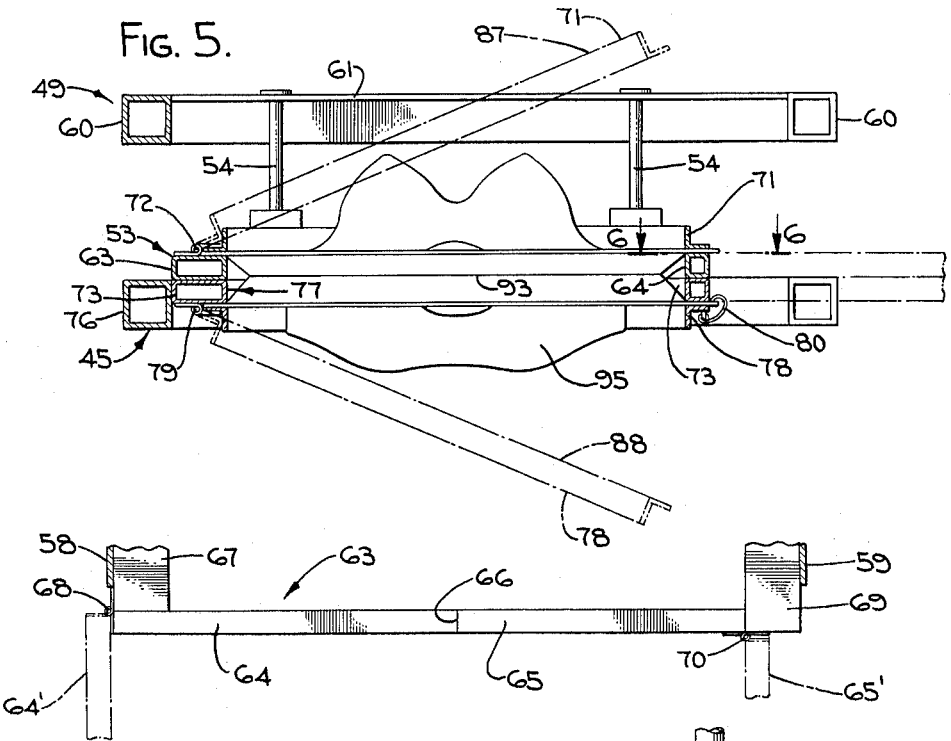
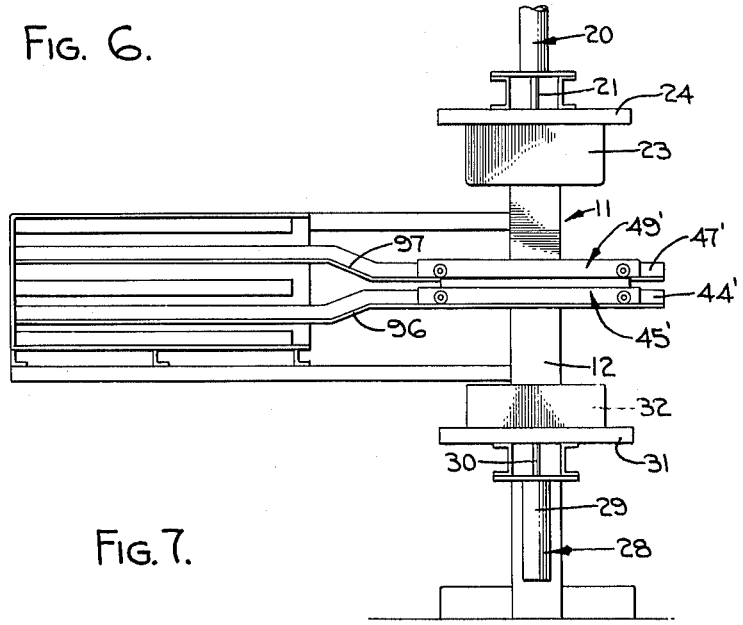

United States Patent Office 3,256,565
Patented June 21, 1966

3,256,565
VACUUM FORMING APPARATUS
John Alesi, Jr., and John A. Alesi, Los Angeles, Calif., assignors to Formex Manufacturing, Inc., a corporation of California
Filed Dec. 31, 1962, Ser. No. 248,596
2 Claims. (Cl. 18—19)

This invention relates to the art of vacuum forming substantially complete enclosures, and more particularly to a method of and apparatus for vacuum forming two halves of an enclosure and fusing the edges of each half together contemporaneously with the vacuum forming thereof.

Although the method and apparatus of the present invention is by no means limited to the uses set forth herein, they have been found to have unusual utility when employed in the fabrication of mannequin trunks.

In the past, the trunk of a mannequin has been constructed by placing a soft heated plastic sheet over and in contact with the edge of a mold cavity or "brain," and withdrawing air from the cavity to draw the sheet into the cavity due to the partial vacuum created in it by the withdrawal of the air from it. This molding operation is well known in the art and is called vacuum forming. The same operation is repeated twice to form the front and rear sides of a mannequin trunk, different molds being used for each. The halves of the trunk formed by performing these steps are cemented together. The cemented seam is then abraded until it becomes smooth.

The prior art method of making a mannequin trunk has been difficult and expensive to practice because the cementing and abrading steps both have had to be performed by hand. What is worse is that the bond made with the cement has been extremely weak and, in general, wholly unsatisfactory for this reason.

The present invention overcomes the above-described and other disadvantages of the prior art by providing a method of vacuum forming a substantially complete enclosure, this method including the steps of supporting two heated plastic sheets in spaced parallel relation, withdrawing air from the cavities of two molds, and moving each of said molds toward each of said sheets and to respective, predetermined positions such that the edges of the cavities therein are spaced a distance from each other but that they lie in contact with and squeeze and fuse the sheets together at a seam thin in comparison to the combined unsqueezed thickness of the sheets. Thus, a secure bond is made between the sheets by fusing the same together. The bond is also made easily, quickly and economically.

According to an outstanding feature of the present invention, sheet supporting frameworks are provided by means of which the above-described method may be performed.

According to an outstanding feature of the present invention a certain sequence of the steps of the method thereof is selected or the air pressure between the plastic sheets is controlled to prevent the sheets from sticking together.

Due to the fact that the plastic sheets must be maintained in positions close to each other, and due to the fact that, at the same time, they must be held in a stretched position while they are at a relatively high temperature, so that they will not stick together, it is another outstanding feature of the present invention that at least one of the sheet supporting frameworks is movable toward the other.

The above described and other advantages of the present invention will be better understood from the following description when considered in connection with the accompanying drawings.

In the drawings which are to be regarded as merely illustrative:

FIG. 1 is a front elevational view of a portion of the apparatus of the present invention;

FIG. 2 is a side elevational view partly in section of the apparatus taken on the line 2—2 shown in FIG. 1;

FIG. 3 is an enlarged vertical sectional view of the apparatus shown in FIGS. 1 and 2;

FIG. 4 is a sectional view similar to that shown in FIG. 3 with the cavities of a pair of molds closed;

FIG. 5 is a vertical sectional view taken through frameworks shown in FIGS. 3 and 4 at the left sides thereof;

FIG. 6 is a sectional view taken on the line 6—6 of the apparatus shown in FIG. 5;

FIG. 7 is a side elevational view of another embodiment of the apparatus of the present invention;

Figure 8:
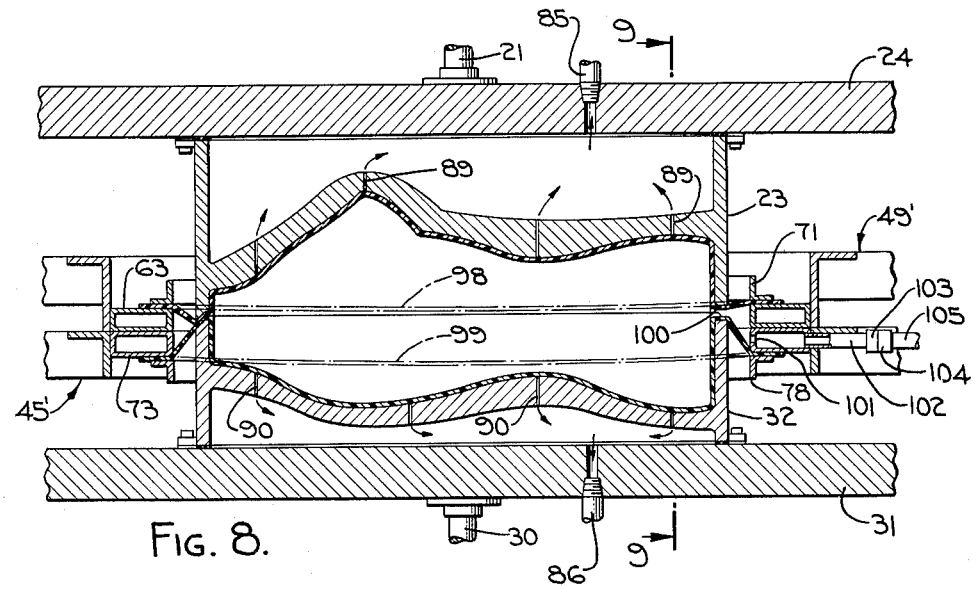
FIG. 8 is a vertical sectional view of the apparatus shown in FIG. 7 similar to the sectional view shown in FIG. 4.

In FIG. 1, vacuum forming apparatus is indicated generally at 10 including a supporting framework 11 having vertical posts 12 and 13 and top horizontal channels 14 and 15 as shown in FIG. 2. Posts 12 and 13 are fixed to floor 16 by channels 17 and 18, respectively.

Channels 14 and 15 are provided with a top plate 19 on which a pneumatic cylinder 20 is rigidly mounted. Ram 20 is provided with a piston rod 21 connected to a piston inside of a cylinder 22, not shown, and to a mold 23 through a platen 24 fixed both to piston rod 21 and to mold 23.

Posts 12 and 13 also have channels 25 and 26 fixed to opposite sides thereof on the bottom of which a plate 27 is fixed. Another pneumatic ram 28 is fixed to plate 27. Ram 28 also includes a cylinder 29 inside of which a piston, not shown, is provided. A piston rod 30 is connected to the piston and to a platen 31 which is fixed rigidly not only with piston rod 30, but also with a mold 32.

Molds 23 and 32 are movable respectively with platens 24 and 31 to dotted line positions indicated respectively at 33 and 34.

As shown in FIG. 2, an oven 35 is provided to heat a pair of plastic sheets. Oven 35 is supported on a pair of angle irons 36 and 37 fixed to posts 13 and 12, respectively. Three angle irons 38 are welded transversely of angle irons 36 to carry oven 35. Oven 35 includes a housing 39 inside of which are provided lower, intermediate and upper sets of heating elements 40, 41 and 42, respectively.

A pair of angle irons 43 and 44 are respectively fixed to posts 12 and 13 to the rear of oven housing 39. Angle irons 43 and 44 form tracks for a lower carriage 45 that is provided with wheels 46, whereby carriage 45 may be rolled into oven 35 between lower and intermediate sets of heating elements 40 and 41. Similarly, as shown in FIG. 1, a pair of angle irons 47 and 48 are fixed to posts 12 and 13 respectively to support a carriage 49. Carriage 49 is also provided with wheels 50, whereby it may be rolled on angle irons 47 and 48 from a position outside of to a position inside of oven 35 between intermediate and upper sets of heating elements 41 and 42.

As shown in FIG. 3, mold 23 is fixed to platen 24 with bolts 51, a gasket 52 being provided between mold 23 and platen 24 around the complete periphery thereof.

Carriage 49 carries a framekork 53 that is slidable vertically on carriage 49 on four shafts 54 fixed thereto. Downward vertical movement of framework 53 is resisted yieldingly by means of four open coil springs 55 that surround shafts 54. The lower ends of springs 55 engage shoulders 56 on shafts 54. The upper ends of springs 55 engage flanges 57 of framework 53.

Framework 53 includes two angle irons 58 and 59 which are provided with flanges 57. Carriage 49 includes transverse tubes 60 and longitudinal angle irons 61 and 62 fixed thereto to support shafts 54. A rectangular tube 63 is welded to angle irons 58 and 59, tube 63 extending in a rectangular fashion along angle irons 58 and 59 and along tube 60. The cross section of the tube 63 is also rectangular. Tube 63 has two separate front halves, as shown at 64 and 65 in FIG. 6, separated at a line 66, half 64 being rotatable on an end portion 67 at a hinge pin 68. Half 65 is also rotatable on an end portion 69 at a hinge pin 70. Halves 64 and 65 are rotatable in a horizontal plane.

As shown in FIGS. 3 and 5, an upper frame or frame means 71 is provided. This frame means is rectangular in shape. Each of its four sides are made of angle irons welded together. Frame 71 is hinged at a hinge pin 72 to tube 63. Tube 63 along with another tube 73 provides intermediate frame means or frames. Tube 73 is identical to tube 63, except that it is welded to transverse angle irons 74 and 75 of carriage 45, carriage 45 having longitudinal tubes 76 welded to transverse angle irons 74 and 75. Carriage 45 includes a framework 77 including tube 73 and a lower frame 78 hinged to tube 73 at a pin 79. Frame 78 may be detachably fixed relative to tube 73 by a hook 80.

As before, mold 32 is fixed to platen 31 by means of bolts 81. A gasket 82 is provided between mold 32 and platen 31 around the entire periphery of mold 32. In the operation of vacuum forming, air is withdrawn from a cavity 83 in mold 23 and a cavity 84 in mold 32 by creating a partial vacuum in the space between platen 34 and mold 23 and by creating a partial vacuum between the mold 32 and platen 31. Air is drawn respectively from these spaces through pipes 85 and 86.

The apparatus 10, shown in FIGS. 1 to 6 inclusive, is employed to vacuum form a substantially complete enclosure, a mannequin trunk. Frames 71 and 78 are first rotated respectively to dotted line positions 87 and 88, as shown in FIG. 5, and a plastic sheet is inserted between frame 71 and tube 63. Frame 71 is then lowered to the solid line position shown in FIG. 5. A plastic sheet is also placed between frame 78 and tube 73, and frame 78 is rotated to the solid line position shown in FIG. 5 and hook 80 is attached to tube 73 to maintain frame 78 in a fixed position relative thereto. All these operations are performed with carriages 45 and 49 in the position shown in FIG. 2.

Carriages 45 and 49 are then moved on angle irons 43, 44, 47 and 48 into oven 35. After the plastic sheets are heated to nearly a liquid consistency, carriages 45 and 49 are withdrawn from oven 35 and again positioned as shown in FIG. 2. Molds 23 and 32 are then brought toward each other to the positions shown in FIG. 3. Air is withdrawn from the space between the molds and their corresponding platens. Air is thus withdrawn from mold cavities 83 and 84, respectively, through holes 89 and 90 through the walls of molds 23 and 32. In this case, plastic sheets, as indicated at 91 and 92, are drawn to the position shown in FIG. 3.

Molds 23 and 32 are then closed to the position shown in FIG. 4. In this position, a fused seam around a mannequin trunk is produced at 93 which lies in contact with the edges of the cavities of molds 23 and 32. Seam 93 includes a portion of the two plastic sheets in contact with each other and squeezed and fused together. Seam 93 is thin in comparison to the combined unsqueezed thicknesses of the sheets.

Note will be taken in FIG. 4 that springs 55 are compressed, whereby tubes 63 and 73 are maintained in contact with one another. Platen 24 pushes tube 63 downwardly by projections 94 thereon.

After the plastic sheets have set, frame 71 is moved to the dotted line position 87. Frame 78 is moved to the dotted line position 88 after hook 80 has been released. Both tubes 63 and 73 are identical. Hence both have portions at 64 and 65 which rotate to dotted line position 64' and 65' so that the mannequin trunk indicated at 94 may be withdrawn from the space inside frames 71 and 78, and tubes 63 and 73.

An alternative embodiment of the present invention is shown in FIG. 7. The entire construction shown in FIG. 7 may be identical to that shown in FIGS. 1 to 6, inclusive, with the exception that carriages 45 and 49 and tracks 44, 45, 47 and 48 are not employed.

In lieu of tracks 44 and 45, a pair of tracks 44' are employed which have downwardly extending portions at 96, as shown in FIG. 7.

In lieu of tracks 47 and 48, a pair of tracks 47' are provided with an upwardly extending portion 97. Carriages 45' and 49' are employed which are identical with carriages 45 and 49 but with the exception that no frameworks are movable relative to carriage 49' as frame 71 and tube 63 are movable vertically on shafts 54 via angle irons 58 and 59. Tracks 44' and 47' come together, whereby carriages 45' and 49' may lie in contact with one another. Specifically, as shown in FIG. 8, tube 63 lies in direct contact with tube 73.

Figure 9:
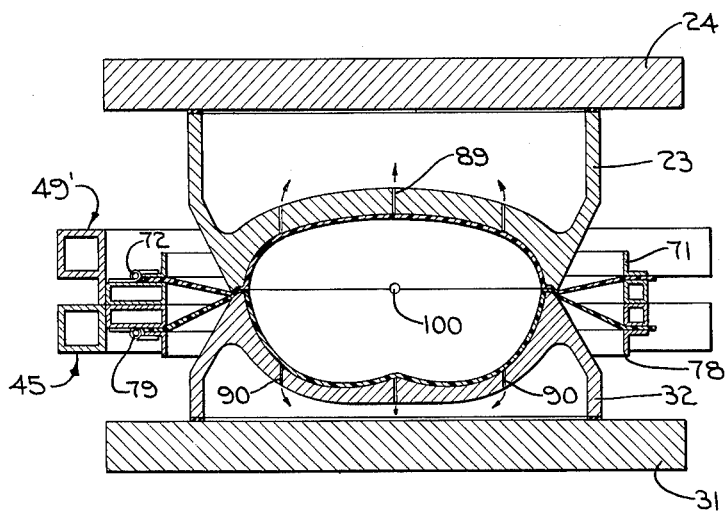
FIG. 9 is a transverse sectional view of the apparatus taken on the line 9—9 shown in FIG. 8.

According to the method of the present invention practiced on the apparatus shown in the FIGS. 7, 8 and 9, molds 23 and 32 may be closed as shown in FIG. 8 before plastic sheets are vacuum molded. Thus plastic sheets may take the positions indicated in dotted lines at 98 and 99 in FIG. 8 before the molds are closed. When the molds are closed, sheets 98 and 99 may take even closer but spaced positions.

After the foregoing steps have been performed, the cavities of molds 23 and 32 may be evacuated to vacuum form the plastic sheets.

Plastic sheets 98 and 99 are kept from sticking together by apparatus to be described hereinafter. In particular, molds 23 and 32 are provided with a circular opening 100 at one end thereof, as shown in FIGS. 8 and 9. This opening makes it possible for the spaces between the plastic sheets both within and without molds 23 and 32 to be in communication with one another. An opening 101 is provided through an inner wall of tube 73. A tube 102 is fixed to the outer wall thereof. A check valve 103 is connected to tube 102. A quick-detachable, high-pressure, air hose coupling 104 for an air hose 105 is connected to check valve 103.

According to one feature of the present invention, coupling 104 may be removed and check valve 103 used successfully by itself. This keeps the air between the sheets 98 and 99 from coming out of the space and between inside and internal surface of tubes 63 and 73.

In addition, if desired, coupling 104 may be attached and air supplied to the space between the plastic sheets 98 and 99 to keep them spaced apart during the time that molds 23 and 32 are being closed.

From the foregoing, it will be appreciated that a mannequin trunk may be easily and quickly made because the cementing and abrading steps which have been preformed by hand in the prior art have been obviated. Still further, the fused seam 93 of the mannequin trunk of the present invention makes a stronger trunk. The method illustrated in FIGS. 3 and 4 prevents the plastic sheets from sticking together by vacuum forming the same before molds 23 and 32 are closed. This same function is also preformed by the apparatus including check valve 103 or coupling 104 and air hose 105, shown in FIG. 8. Still further, the use of the frames on the carriages 45, 45', 49 and 49' make it possible to support the plastic sheets in appropriate positions at which an entire mannequin trunk may be vacuum formed, i.e. both halves thereof may be formed and fused together contemporaneously.

Although only two specific embodiments of the present invention have been described and illustrated herein, many changes and modifications thereof will of course suggest themselves to those skilled in the art. These embodiments have been selected for this disclosure for the purpose of illustration only. The present invention should therefore not be limited to the embodiments so selected, the true scope of the invention being defined only in the appended claims.

What is claimed is:

1. A vacuum forming framework comprising: lower open frame means; intermediate open frame means, said intermediate frame means having one side movable relative to but in the same plane as the ends thereof; and upper open frame means.

2. A vacuum forming framework comprising: lower open frame means; intermediate open frame means hinged at one side to one side of said lower open frame means, said intermediate frame means having a split side opposite said one side, said split side including a first section hinged from one end of said intermediate frame means to rotate in the plane of the ends thereof, said split side including a second section hinged to the other end thereof to rotate in said plane; and upper frame means hinged to said one side of said intermediate frame means.

References Cited by the Examiner

UNITED STATES PATENTS

| | | | |
|---|---|---|---|
| 1,404,320 | 1/1922 | Roberts et al. | 18—18 |
| 1,482,707 | 2/1924 | Skinner | 156—145 |
| 1,514,183 | 11/1924 | Steele et al. | 18—19 |
| 1,574,060 | 2/1926 | Roberts | 156—145 |
| 1,654,647 | 1/1928 | Heist | 18—19 X |
| 2,224,363 | 12/1940 | Voit et al. | 156—228 X |
| 2,266,956 | 12/1941 | Brundage | 18—19 |
| 2,345,112 | 3/1944 | Grundel | 18—56 |
| 2,353,996 | 7/1944 | Cooke et al. | 18—56 |
| 2,364,029 | 11/1944 | Ryan | 156—228 |
| 2,771,619 | 11/1956 | Stewart | 18—19 |
| 2,814,074 | 11/1957 | Butzko | 18—19 |
| 3,013,301 | 12/1961 | Lang | 18—19 |
| 3,040,380 | 6/1962 | Alosky | 18—19 |
| 3,127,497 | 3/1964 | Taylor | 18—19 X |
| 3,133,314 | 5/1964 | Arnould et al. | 18—19 |
| 3,166,790 | 1/1965 | Keyes | 18—19 |

FOREIGN PATENTS

| | | |
|---|---|---|
| 75,414 | 6/1929 | Sweden. |

WILLIAM J. STEPHENSON, *Primary Examiner.*

MORRIS LIEBMAN, M. H. ROSEN, *Examiners.*